United States Patent
Barnes

(10) Patent No.: US 8,432,563 B2
(45) Date of Patent: Apr. 30, 2013

(54) SYSTEMS AND METHODS FOR DYNAMICALLY RE-CONFIGURING IMAGER AND CACHING MODULES TO OPTIMIZE RASTER IMAGE PROCESSING PERFORMANCE

(75) Inventor: Eric S. Barnes, Manhattan Beach, CA (US)

(73) Assignee: Xerox Corporation, Norwalk, CT (US)

( * ) Notice: Subject to any disclaimer, the term of this patent is extended or adjusted under 35 U.S.C. 154(b) by 1065 days.

(21) Appl. No.: 11/411,067

(22) Filed: Apr. 24, 2006

(65) Prior Publication Data

US 2007/0247658 A1    Oct. 25, 2007

(51) Int. Cl.
- G06F 3/12 (2006.01)
- G06F 17/00 (2006.01)
- G06K 9/36 (2006.01)

(52) U.S. Cl.
USPC ....... 358/1.15; 358/1.12; 358/1.13; 358/1.16; 358/1.18; 358/1.2; 358/1.9; 358/2.1; 358/2.99; 358/3.03; 358/3.06; 358/3.3; 358/501; 358/515; 382/162; 382/164; 382/166; 382/167; 382/171; 382/181; 382/256; 382/266; 382/270; 382/284; 715/209; 715/226; 715/243; 715/246; 715/251; 715/269; 715/231; 715/273; 715/716

(58) Field of Classification Search .................. 358/1.15, 358/1.12, 1.13, 1.16, 1.18, 1.2, 1.9, 2.1, 2.99, 358/3.03, 3.06, 3.3, 501, 515; 382/162, 164, 382/166, 167, 171, 181, 256, 266, 270, 284; 345/467, 472, 502, 504, 533
See application file for complete search history.

(56) References Cited

U.S. PATENT DOCUMENTS

| | | | | |
|---|---|---|---|---|
| 6,049,390 | A * | 4/2000 | Notredame et al. | 358/1.15 |
| 6,867,876 | B1 * | 3/2005 | Czyszczewski et al. | 358/1.15 |
| 7,391,529 | B2 * | 6/2008 | Glaspy et al. | 358/1.18 |
| 2003/0076535 | A1 | 4/2003 | Prosi | 358/1.16 |
| 2004/0066527 | A1 | 4/2004 | Kloosterman et al. | |
| 2004/0136033 | A1 * | 7/2004 | Glaspy et al. | 358/1.18 |
| 2004/0196470 | A1 | 10/2004 | Christiansen | |
| 2005/0058481 | A1 * | 3/2005 | Christiansen et al. | 400/70 |
| 2005/0141020 | A1 * | 6/2005 | Harano | 358/1.15 |
| 2005/0276519 | A1 * | 12/2005 | Kitora et al. | 382/305 |
| 2006/0152755 | A1 * | 7/2006 | Curtis et al. | 358/1.15 |

FOREIGN PATENT DOCUMENTS

EP    0 806 721 A1    11/1997

OTHER PUBLICATIONS

EP Search Report for EP Application 07106838.1 dated Mar. 16, 2010.

\* cited by examiner

Primary Examiner — Steven Kau
(74) Attorney, Agent, or Firm — Kermit D. Lopez; Luis M. Ortiz; Kevin Soules

(57) ABSTRACT

Systems and methods for generating a dynamic re-configuration with a DFE imager and caching modules to optimize RIP performance by analyzing pages within the job that collect page with job heuristics and statistics. Enabling the functionality to assess the information, thereby re-configuring a digital printer's imager and caching module dynamically during the job RIP to achieve improved overall RIP performance. Accordingly, a system collects and assesses job statistics across multiple jobs to enable optimum performance over time.

19 Claims, 4 Drawing Sheets

SYSTEMS AND METHODS FOR DYNAMICALLY RE-CONFIGURING IMAGER AND CACHING MODULES TO OPTIMIZE RASTER IMAGE PROCESSING PERFORMANCE

TECHNICAL FIELD

Embodiments are generally related to data-processing systems and methods. Embodiments also relate to image processing systems and methods. Embodiments additionally relate to image-processing systems and methods. Embodiments also relate to Digital Front End (DFE), caching modules and Raster Information Processing (RIP) systems and methods.

BACKGROUND OF THE INVENTION

Almost all digital and image display technologies rely on a technique known as Raster Image Processing (RIP) to produce images on a passive or active display medium, such as paper or an electronic screen. A digital printer's imager and caching module can be configured prior to the start of a job and have limited capabilities to adjust the way each page is processed. Every page of a long document will possess the same parameters applied even if the parameters are not optimal. This is especially poor for variable information (VI) jobs that a print shop or print customers believe should RIP at a fast rate. There are some dynamic adjustments implemented today, but they are quite limited. For many print jobs it has been found that the original configuration is not optimum and would benefit if parameter adjustments were made. Today's configuration changes are accomplished manually between jobs, via trial-and-error printing, or as a result of a customer complaint.

Print on demand (POD) is the printing process that delivers exactly and only what the customer wants, when the customer wants it, at the place where it is needed. Equipment manufacturers have made great strides to develop special technology to meet the "on demand" needs of customers. Traditional equipment manufacturers as well as new players or those that have adapted digital pre-press technology to printing technology are racing through product development cycles introducing new technology. Technology continues to change rapidly.

An example of a prior art RIP technology is disclosed in United States Patent Application Publication No: 2005/0058481 to Christiansen et al, which published on Mar. 17, 2005 and is entitled "Selectable Control of Raster Image Processor." U.S. Patent Publication No: 2005/0058481 generally describes digital printing technologies that often rely on raster image processors (RIPs or RIP engines) to convert vector image data to raster, or bit-map, data, which allows a printer to render the image as a pattern of dots or pixels. One problem with RIPs such as that disclosed in U.S. Patent Publication No: 2005/0058481 is that such technologies offer limited communications capabilities and can in some circumstances reduce the effective processing speed.

Another example of a prior art RIP technology is disclosed in United States Patent application Publication No: 2003/0076535 to Prosi, which published on Apr. 24, 2003 and is entitled "Banded compositor for variable data." U.S. Patent application Publication No: 2003/0076535 generally describes a method and apparatus for Variable Data Printing that adds performance requirements to a raster image processor (RIP) memory optimization and which also employs memory bands within the page composition process. Documents containing both recurring elements as well as non-recurring elements are sorted into element lists depending on their frequency of recurrence and their layering position. The recurring elements are retained in rasterized form, while the non-recurring elements are rasterized as they are used in output memory. One pass assembly in raster image processing of the elements occurs when the recurring elements are placed into memory and the variable elements are RIPped on the fly.

Based on the foregoing, it is believed that a need exists for an improved image processing apparatus, methodology and system thereof. For many print jobs, it has been found that the original configuration is not optimum and would benefit if parameter adjustments were made. It is believed by the present inventor that the reconfiguration of DFE and caching modules as disclosed herein can optimize RIP performance, thereby overcoming the problems associated with the prior art.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore one feature of the present invention to provide for an improved data-processing system and method.

It is another feature of the present invention to provide for an improved image-processing system and method, including improved raster image processor (RIP) performance.

It is yet another feature of the present invention to provide for systems and methods for dynamically re-configuring a DFE imager and caching modules to optimize RIP performance.

It is a further feature of the present invention to provide for systems and methods for dynamically re-configuring a DFE imager and caching modules to optimize RIP performance by analyzing pages within a job and adaptively configuring page compression and assembly constraints thereby enabling the creation of cached object, composites and underlays that can be re-used through a job.

The aforementioned features and advantages can now be achieved as described herein. A digital front-end (DFE) interpreter-imager-caching module can be configured based on historical optimum configuration parameters. The configuration calls for a fast pass through the job manager where the time consuming computer intensive objects on each page are decomposed quickly into only empty box representations. The pages are not imaged or compressed for printing, rather, they are processed to collect and assess the object and reusable document component (RDC) markup of the pages and overall job. Such an interpreter-imager-caching module pass operation is very fast.

The statistics collected from a capture object and cached object statistics with area and position information can be then used to modify the parameters for a re-configuration of the interpreter-imager-caching module prior to the decomposition pass with optimized interpret, RIP and assembler pass that creates compressed buffers feeding the buffer manager and marker. The decomposition pass also captures statistics based on collected objects and compression as the job progresses and uses such features to dynamically adjust configuration according to how the pages are processed altering methods of collecting objects, caching components and compressing and assembling components and pages.

Optimum configuration for the job can be achieved after only a few pages or after many pages. At the completion of the job, the final configuration can be then utilized to confirm or modify the historical configuration to be used for subsequent jobs that are based on the optimized RIP and VI assembly utilizing feedback from historical statistics, from pre-RIP statistics and dynamic re-configuration.

In accordance with an alternative embodiment, an option can be provided by using the optimized RIP, VI assembly using historical statistics and dynamic re-configuration as a job is RiPped. The job statistics can then be assessed to modify the configuration parameters. Another option is to capture the statistics and report the suggested configuration changes to the printer operator for authorization before applying them. The customer/operator may not want the optimizations applied and may insist any changes be authorized before being applied. An authorized change can be applied between jobs and/or the RIP of pages.

BRIEF DESCRIPTION OF THE DRAWINGS

Features, aspects and advantages of the present invention will become better understood with regard to the following description, appended claims, and accompany drawings where:

DETAILED DESCRIPTION

The particular values and configurations discussed in these non-limiting examples can be varied and are cited merely to illustrate the aspects of the present invention and are not intended to limit the scope of the invention.

Figure 1:
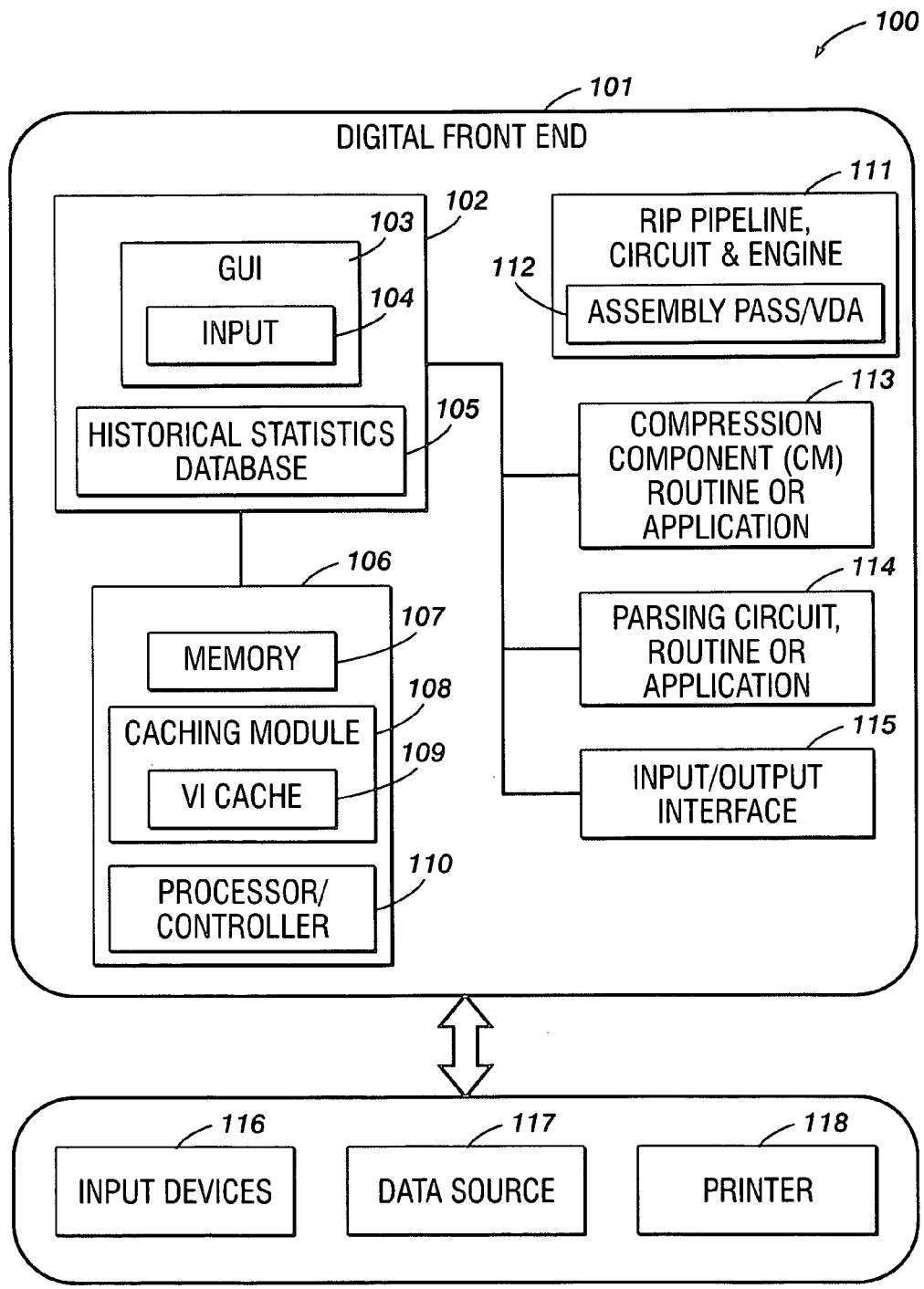
FIG. 1 illustrates a block diagram of a system for dynamically re-configuring a DFE imager and caching modules to optimize RIP performance in accordance with a preferred embodiment.

Referring to FIG. 1, a block diagram of a system 100 is illustrated that depicts components for dynamically re-configuring a DFE imager and caching modules to optimize RIP performance in accordance with a preferred embodiment. System 100 includes a digital front end (DFE) 101 that incorporates the use of a job/RIP manager 102, which includes a graphical user interface (GUI) module 103 that can be displayed on a display device. The input 104 is used for inputting data from the data source 117, which includes forms with the help of input devices using a keyboard, mouse or other input devices 116. The database that is of a historical statistics database 105 includes data identification, data updation, data insertion and related status. The DFE can also include processing resources 106 that include an inbuilt memory 107 used for storing data, parsing circuit routines or application statistics and other related system oriented data for the system functionality.

Memory 107 can be implemented using any appropriate combination of alterable, volatile or non-volatile memory or non-alterable, or fixed, memory. System 100 can further include a cache 108 can hold reusable document components (RDCs) within a VI cache 109. A variable information cache (VI) 109 can be used in reference to capture object and cached object statistics with area and position information to modify configuration parameters. The processor/controller 110 can be utilized for enhancing RIP performance and for controlling the functionality the system 100. The DFE can be configured with the RIP pipeline, circuit and engine 111 for enhancing the functionality of the assembly pass/variable data assembler VDA 112 with page assembly component analysis. The compression component/component module 113 and the routine or application 114 is configured with the job/RIP manager for defining the DFE RIP process. Then the parsing circuit, routine or application 114 can also be configured with the job/RIP manager for proper process development of the system. The input/output interface 115 is interfaced with the input device such as keyboard, mouse etc., and printer 118.

Figure 2:
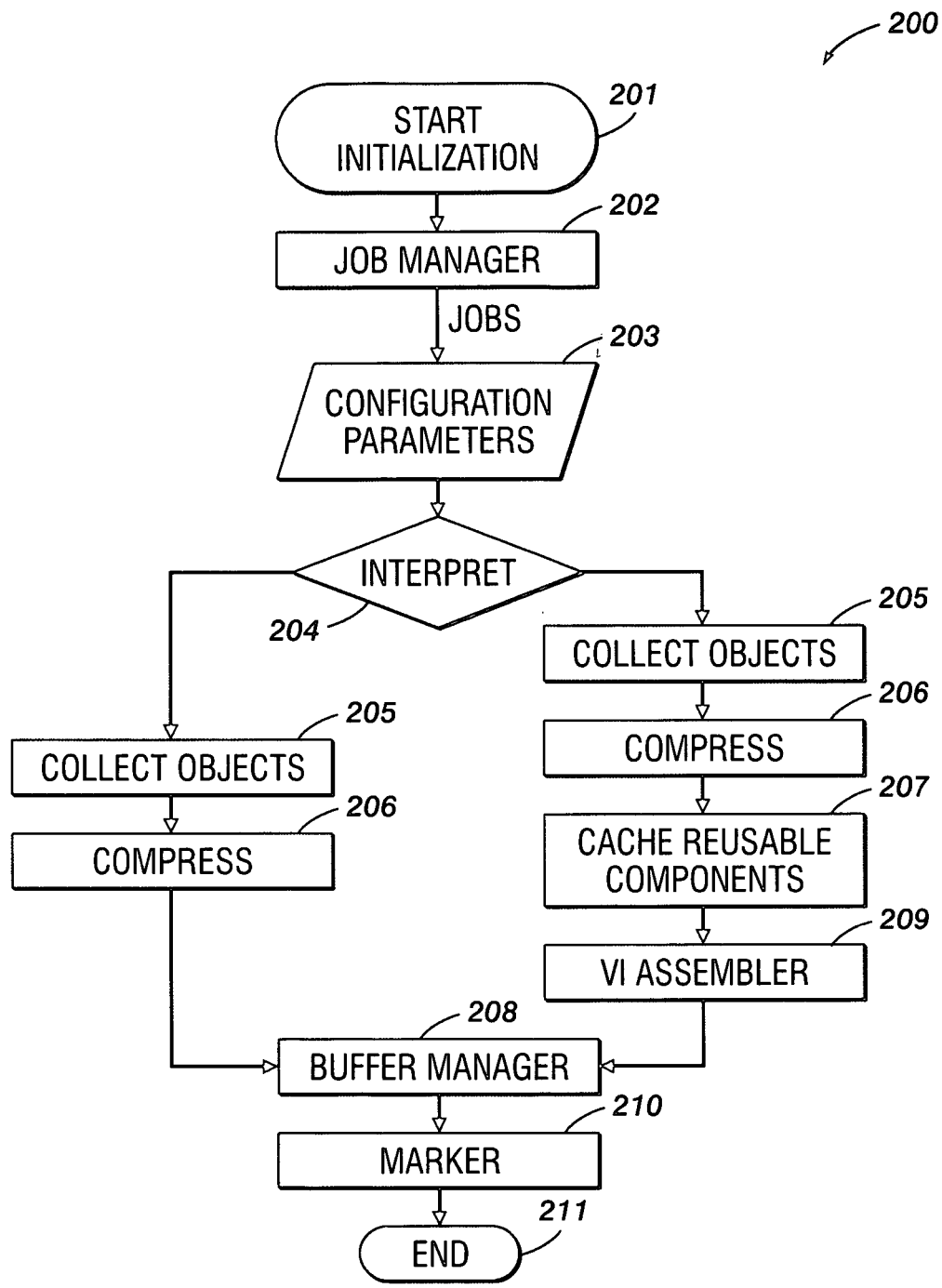
FIG. 2 illustrates a high-level flow chart of operations depicted logical operational steps for dynamically re-configuring the DFE imager and caching modules to optimize RIP performance with the current static configuration prior to job RIP, in accordance with a preferred embodiment.

Referring to FIG. 2 a high-level flow chart 200 is depicted illustrating logical operational steps for outlining a current static configuration to job RIP with CDF (Common Decomposer Facility) for dynamically re-configuring the DFE imager and caching modules to optimize RIP, in accordance with a preferred embodiment. As depicted at block 201, the system 100 of FIG. 1 can first be initialized. Next, as indicated at block 202, the job manager can be established as shown in Block 202. One or more configuration parameters can be modified by a system operator between jobs as illustrated thereafter at block 203. Next, as depicted at block 204, the current CDF (Common Decomposer Facility) high-lighting the imager interprets and then, as indicated at block 205, collects page objects.

Thereafter, as described at block 206, a compression module can begin processing. The operation described at block 206 illustrates an assembly test operation. The operations described at blocks 207 or 208 can be processed depending upon the outcome of the testing operation illustrated at block 206. Caching reusable components can be enabled as indicated at block 207. Alternatively, as indicated at block 208 a buffer manager operation can be processed. Following processing of the operation depicted at block 207, the VI Assembler operation indicated at block 209 can be processed. If the page objects need not to be sent to cache reusable components, it can be sent to a buffer manager, again as indicated at block 208, and then to a marker as indicated at block 210. The process depicted in flow chart 200 can finally terminate as indicated at block 211.

Figure 3:
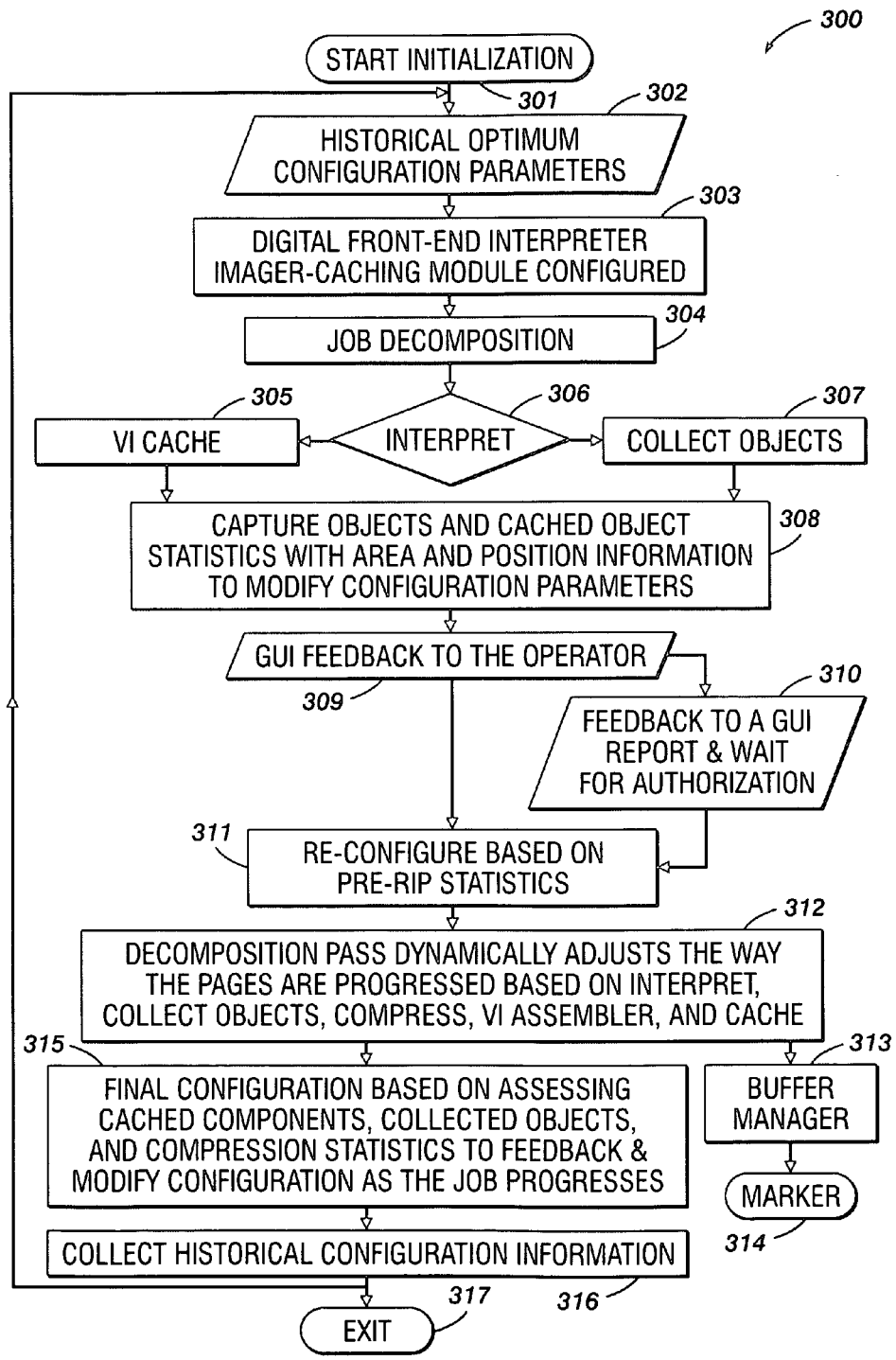
FIG. 3 illustrates a high-level flow chart of operations depicting logical operational steps for dynamically, or with an operator's authorization, re-configuring the DFE imager and caching modules to optimize RIP performance in accordance with a preferred embodiment.

Referring to FIG. 3, a flow chart 300 of operations is illustrated depicting logical operational steps for dynamically re-configuring a DFE imager and caching modules to optimize RIP performance with optimized RIP and VI assembly using feedback from historical statistics, from pre-RIP statistics, and enabling dynamic re-configuration in accordance with a preferred embodiment. As indicated at block 301, the process is initialized. Thereafter, as indicated at block 302, historical optimum configuration parameters can be established. Next, as indicated at block 303, the digital front-end (DFE) interpreter-imager-RDCR can be configured based on historical optimum configuration parameters established previously as depicted at block 302.

As illustrated next at block 304, a job decomposition operation can be established. That is, the configuration calls for a fast pass through the job where the time consuming computer intensive objects on each page are decomposed quickly into only empty box representations. The pages are not imaged or compressed for printing, rather, they are processed to interpret as indicated at block 306 with a condition for a VI cache as indicated at block 305 and to collect objects as depicted at block 307.

Then, as indicated at block 308, the captured objects and cached object statistics with area and position information can be utilized to modify configuration parameters that assess the object and RDC makeup of the pages and overall job. This interpreter-imager-caching pass is very fast because the pages are not imaged fully or compressed for full display or printing. The statistics collected from GUI feedback can be provided to the operator as illustrated at block 309. Thereafter, as described at block 310, feedback can be compiled in a GUI report 310 and can then be used to modify the parameters for a re-configuration as indicated next at 311 of the interpreter-imager-cache prior to the decomposition pass operation depicted at block 312 that creates compressed buffers feeding the buffer manager as indicated at block 313 and marker as described at block 314.

The decomposition pass also captures statistics as indicated at block 315 as the job progresses and uses these to dynamically adjust the way pages are processed. The optimum configuration for the job will be achieved after only a few pages or after many pages. At the completion of the job, the final configuration is used to confirm or modify the historical configuration as indicated at block 316 and to be used for following jobs until completion as depicted at block 317.

Figure 4:
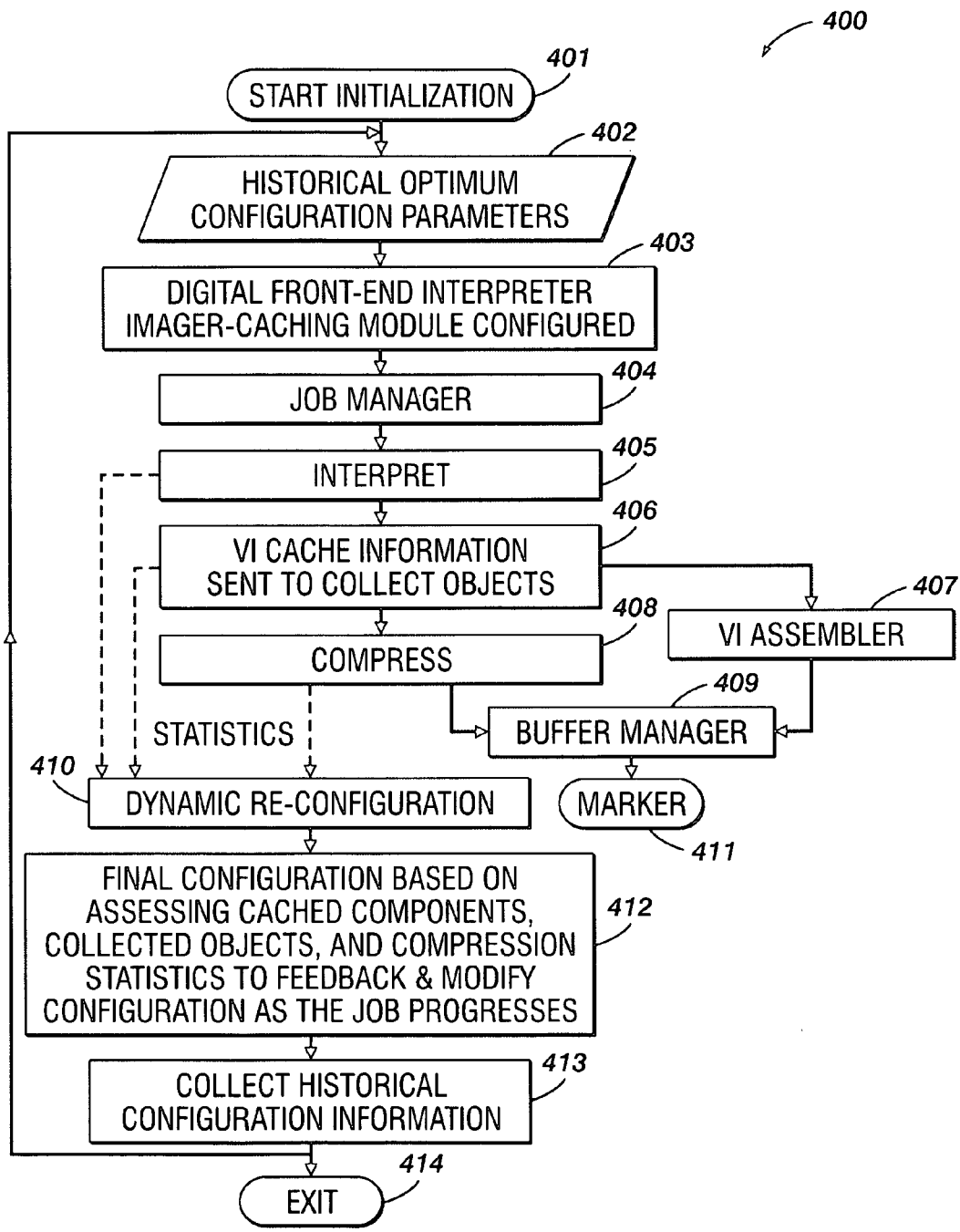
FIG. 4 illustrates a high-level flow chart of operations depicting logical operational steps for dynamically re-configuring the DFE imager and caching modules to optimize RIP performance with the optimized RIP and VI assembly using historical statistics and dynamic re-configuration in accordance with a preferred embodiment.

Referring to FIG. 4, a flow chart 400 is illustrated depicting logical operational steps for dynamically re-configuring the DFE imager and caching modules to optimize RIP performance with optimized RIP and VI assembly using historical statistics and execute dynamic re-configuration of the DFE in accordance with a preferred embodiment. The process can be initialized as indicated at block 401. Thereafter as depicted at block 402, historical optimum configuration parameters can be established.

As depicted at block 403, digital front-end (DFE) interpreter-imager-RDCR can be configured based on historical optimum configuration parameters established previously as indicated at block 402. Following processing of the operation described at block 403, the configuration calls for dynamic reconfiguration via block 410 based on the assessment of statistics collected during the interpret 405, object collection and VI caching 406, and the compression 408 stages. VI cache information can be sent to collected objects as indicated at block 406 through a VI assembler as illustrated at block 407 and compression. Based on the condition from VI cache information the page objects from the VI assembler and the compressed buffers as indicated at block 408 feeding the buffer manager as described at block 409 and marker as illustrated at block 411.

As the job progresses dynamic re-configuration as indicated at block 410 is set up by enabling a configuration that is based on assessing cached components, collected objects, and compression statistics can be provided as feedback in order to modify the configuration as the job progresses as depicted at block 412. The historical configuration can be collected for subsequent jobs till execution or termination of the process as indicated at block 414.

Note that embodiments can be implemented in the context of modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product based on instruction media residing in a computer memory that can be implemented through signal-bearing media, including transmission media and recordable media, depending upon design considerations and media distribution goals. Such instruction media can thus be retrieved from the computer memory and processed via a processing unit, such as, for example, a microprocessor.

The methodology described above, for example, with respect to FIGS. 2-4 can be implemented as one or more such modules. Such modules can be referred to also as "instruction modules" and may be stored within a memory of a data-processing apparatus such as memory 107 of system 100 depicted in FIG. 1. Such instruction modules may be implemented in the context of a resulting program product (i.e., program "code"). Note that the term module and code can be utilized interchangeably herein to refer to the same device or media. Similarly, many of the features depicted in FIGS. 1-4 can be provided by or in the form of such modules.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for dynamically configuring imagers and caching modules to optimize processing performance of digital printers, comprising:

configuring an imager associated with a digital printer to complete a fast pass scan of a document to read configuration parameters from a at least one uncompressed page of a printable document where objects on said at least one uncompressed page are decomposed into empty box representations;

establishing historical optimum configurations;

configuring a caching module associated with the digital printer to store said configuration parameters, reusable document components, and said empty box representations associated with said configuration parameters; and modifying the configuration of said imager based on said configuration parameters, said reusable document components, and said historical optimum configurations;

wherein said configuring of the imager and of the caching module is accomplished utilizing a graphical user interface associated with the digital printer.

2. The method of claim 1 further comprising the step wherein additional configuring of the imager is executed if at least one reusable document component is created from the at least one page of a printable document and the at least one reusable document component is cached.

3. The method of claim 2 further comprising the step of re-configuring the imager and caching module during a print job based on the at least one reusable document component that is cached.

4. The method of claim 3 further comprising the step of re-configuring the imager and caching module based on compressing at least one page during a print job.

5. The method of claim 3 further comprising the step of re-configuring the imager and caching module by assembling at least one page during a print job and using said assembly as feedback in order to modify the configuration of said imager.

6. The method of claim 3 further comprising the step of re-configuring the imager and caching module based on assembling a composite underlay during a print job.

7. The method of claim 1 wherein said configuring of the imager and the caching module is further accomplished using the information related to page data including at least one of job heuristics and historical statistics.

8. The method of claim 1 wherein configuring is authorized by a printer operator before application to a digital front end associated with the digital printer.

9. The method of claim 8 wherein authorized configurations can be applied between jobs and/or the raster image processing of document pages.

10. A method for optimizing processing performance of digital printers, comprising:
    initiating a pass of uncompressed multiple page document through a digital printer wherein objects on each page of the uncompressed multiple page document are decomposed by a job manager into empty box representations, wherein each page are processed to collect and assess object and reusable document component markups of each page;
    accessing historical optimum configuration parameters, said statistics including area and position information;
    using the historical optimum configuration parameters to modify operating parameters of a digital front-end interpreter-imager-caching module associated with the photocopier; and
    processing the multiple page document through the digital printer following the modification of the digital front-end interpreter-imager-caching module.

11. The method of claim 10 wherein the initial pass also captures statistics based on collected objects and compression as the job progresses and uses such features to dynamically adjust assessing cached components, collected objects, and compression statistics to feedback and modify digital front-end interpreter-imager-caching module configuration according to how the pages are processed.

12. The method of claim 11 including the step wherein after completion of the processing of the multiple document following modification of the digital front-end interpreter-imager-caching module, the modification information is included with historical optimum configuration parameter information for access during processing subsequent jobs.

13. The method of claim 10 wherein modification of operating parameters of a digital front-end interpreter-imager-caching module is authorized by a printer operator before application.

14. The method of claim 13 wherein authorized modifications can be applied between jobs and/or the raster image processing of document pages.

15. A system for dynamically modifying digital front ends and caching modules to optimize processing performance by digital printers, comprising:
    a database containing document processing statistics including area and position information;
    a digital front end including a processing device, an inbuilt memory, parsing circuit routines, an imager, caching modules, and a RIP manager for receiving page description language (PDL) and processing scanned uncompressed document data;
    a variable information cache associated with said inbuilt memory that is used to capture object statistics;
    a graphical user interface for managing the digital front end and document data; and
    a controller adapted to utilize said document processing statistics as historical optimum configuration parameters to modify said digital front end and associated caching modules to enhance raster image processing performance and controlling functionality of the system.

16. The system of claim 15 wherein modification of the digital front end also calls for an initial decomposition pass of a PDL document through a job manager wherein objects associated with the document are decomposed into empty box representations, and wherein the pages are only processed to collect and assess the objects and overall job information, said objects and overall job information being stored as said historical optimum configuration parameters.

17. The system of claim 15 wherein said digital front end further comprises a digital front-end interpreter-imager-caching module configured based on historical optimum configuration parameters.

18. The system of claim 16 wherein said historical optimum configuration parameters are used to modify its parameters for re-configuration of an interpreter-imager-caching module prior to decomposition pass of subsequent documents.

19. The system of claim 16 wherein the decomposition pass also captures statistics based on collected objects and compression as the job progresses and uses such features to dynamically adjust assessing cached components, collected objects, and compression statistics that can be used as feedback to modify system configuration as the job progresses.

* * * * *